United States Patent
Yu et al.

(10) Patent No.: US 11,734,454 B2
(45) Date of Patent: Aug. 22, 2023

(54) METHOD FOR PROVIDING APPLET SERVICE CAPABILITY, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Cong Yu, Beijing (CN); Yuanxu Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 165 days.

(21) Appl. No.: 17/342,123

(22) Filed: Jun. 8, 2021

(65) Prior Publication Data
US 2021/0294911 A1    Sep. 23, 2021

(30) Foreign Application Priority Data
Aug. 27, 2020   (CN) .......................... 202010879893.7

(51) Int. Cl.
G06F 21/62   (2013.01)
H04L 9/32    (2006.01)
H04L 9/40    (2022.01)

(52) U.S. Cl.
CPC .......... *G06F 21/629* (2013.01); *H04L 9/3213* (2013.01); *H04L 63/0853* (2013.01); *H04L 63/108* (2013.01)

(58) Field of Classification Search
CPC .......... G06F 21/629; G06F 8/20; G06F 21/33; G06F 21/44; G06F 9/44568; G06F 9/451; G06F 9/543; H04L 9/3213; H04L 63/0853; H04L 63/108; H04L 67/34; H04L 63/0807
See application file for complete search history.

(56) References Cited

U.S. PATENT DOCUMENTS 8,694,438 B1 *   4/2014   Jernigan .......... G06Q 20/40975
                                                       705/67
2002/0161880 A1   10/2002   Kishimoto et al.
(Continued)

FOREIGN PATENT DOCUMENTS

JP   2002324011 A   11/2002
JP   2020024656 A    2/2020

OTHER PUBLICATIONS

Extended European Search Report issued in corresponding EP Application No. 21176147.3 dated Nov. 15, 2021 (7 pages).
(Continued)

*Primary Examiner* — Carl G Colin
*Assistant Examiner* — Hany S. Gadalla
(74) *Attorney, Agent, or Firm* — Osha Bergman Watanabe & Burton LLP (57) ABSTRACT

A method for providing an applet service capability includes: receiving an operation accessing request sent by an applet merchant though an applet management platform, in which the operation accessing request includes an applet token, an applet identifier and an operation accessing type; performing authentication on the operation accessing request through the applet management platform; and providing an applet service capability corresponding to the operation accessing request for the applet merchant when the authentication is passed.

17 Claims, 4 Drawing Sheets

(56) References Cited

U.S. PATENT DOCUMENTS

| | | | | |
|---|---|---|---|---|
| 2003/0140007 A1* | 7/2003 | Kramer | ............ | G06Q 20/12 |
| | | | | 705/40 |
| 2004/0255169 A1 | 12/2004 | Little et al. | | |
| 2012/0290445 A1 | 11/2012 | Wilson et al. | | |
| 2013/0346302 A1* | 12/2013 | Purves | ............ | G06Q 20/102 |
| | | | | 705/40 |
| 2014/0020068 A1* | 1/2014 | Desai | ............ | G06Q 20/3227 |
| | | | | 726/4 |
| 2014/0325627 A1* | 10/2014 | Fee | ............ | H04L 63/0807 |
| | | | | 726/7 |
| 2017/0272413 A1* | 9/2017 | Adams | ............ | H04L 63/0823 |
| 2022/0277068 A1* | 9/2022 | Miyazaki | ............ | G06F 21/57 |

OTHER PUBLICATIONS

Vudragovic, Dusan et al. "Dwarf—The Framework for Authorized YUM/APT Repositories Management" Infoteh-Jahorina vol. 8, Ref. E-V-8, p. 721-725, Mar. 2009 (6 pages).

Wechat: 11WeChat Mini Program Framework(WMPF) Introduce—WeChat Official Agency, Jan. 17, 2020 (Jan. 17, 2020), XP055858073, Retrieved from the Internet: <URL:http://www.wechatapply.com.au/wechat-mini-program-frameworkwmpf-introduce/> [retrieved on Nov. 4, 2021] (16 pages).

Office Action issued in corresponding JP Application No. 2021-116800 with English translation dated May 24, 2022 (4 pages).

\* cited by examiner

```
┌─────────────────────────────────────────────────────────────────────┐
│   receiving the operation accessing request sent by the applet      │
│       merchant through an interaction interface in the applet       │
│                      management platform; or                        │
│   receiving the operation accessing request sent by the applet      │     S301
│    merchant through a third party platform in the applet            │
│                  management platform; or                            │
│   receiving the operation accessing request sent by the applet      │
│    merchant through a developer interface in the applet             │
│                    management platform;                             │
│  wherein the applet token comprises a common token, a token under   │
│   a predetermined development framework, or an application token    │
└─────────────────────────────────────────────────────────────────────┘
                                   │
                                   ▼
┌─────────────────────────────────────────────────────────────────────┐
│   when the operation accessing request is received through the      │
│   interaction interface, extracting the common token from the       │
│   operation accessing request, and sending the common token to an   │
│         access gateway in the applet management platform;           │
│   when the operation accessing request is received through the      │     S302
│   third-party platform, extracting the token under the              │
│   predetermined development framework from the operation            │
│   accessing request, and sending the token under the predetermined  │
│        development framework to the access gateway; or              │
│   when the operation accessing request is received through the      │
│   developer interface, extracting the application token from the    │
│   operation accessing request, and sending the application token    │
│                      to the access gateway                          │
└─────────────────────────────────────────────────────────────────────┘
                                   │
                                   ▼
┌─────────────────────────────────────────────────────────────────────┐
│  performing the authentication on the common token through the      │
│  access gateway; performing the authentication on the token under   │     S303
│  the predetermined development framework through the access         │
│  gateway ; and performing the authentication on the application     │
│              token through the access gateway                       │
└─────────────────────────────────────────────────────────────────────┘
                                   │
                                   ▼
┌─────────────────────────────────────────────────────────────────────┐
│  parsing the operation accessing type from the operation accessing  │     S304
│             request when the authentication is passed               │
└─────────────────────────────────────────────────────────────────────┘
                                   │
                                   ▼
┌─────────────────────────────────────────────────────────────────────┐
│  obtaining an applet service authority corresponding to the         │
│  operation accessing request from an applet common capability unit  │     S305
│  in the applet management platform based on the operation           │
│                       accessing type                                │
└─────────────────────────────────────────────────────────────────────┘
                                   │
                                   ▼
┌─────────────────────────────────────────────────────────────────────┐
│  providing the applet service authority corresponding to the        │
│  operation accessing request for the applet merchant, such that     │     S306
│  the applet merchant obtains the applet service capability          │
│         corresponding to the applet service authority               │
└─────────────────────────────────────────────────────────────────────┘
```

METHOD FOR PROVIDING APPLET SERVICE CAPABILITY, ELECTRONIC DEVICE, AND STORAGE MEDIUM

CROSS-REFERENCE TO RELATED APPLICATION

This application is based upon and claims a priority to Chinese Patent Application No. 202010879893.7, filed with the State Intellectual Property Office of P.R. China on Aug. 27, 2020, the entire contents of which are incorporated herein by reference.

FIELD

The disclosure relates to a field of applet technologies, and particularly relates to a method and an apparatus for providing an applet service capability, an electronic device, and a storage medium.

BACKGROUND

As an on-demand, lightweight and fast application, an applet is favored by more and more merchants. However, different merchants have different independent research and development capabilities. For example, some merchants need to use an interaction interface provided by a platform side to perform maintenance operation, while some other merchants are more inclined to use an interface provided by a platform side due to their strong research and development capability. However, more small merchants select a third-party platform for hosting because they do not have a development and maintenance capability. In this way, different development and maintenance modes cause the platform side to provide respective modules for supporting. Generally, the platform side may include: a platform that requires the interaction interface and a platform that does not require the interaction interface. Further, the platform does not require the interaction interface may also include the third-party platform and a developer platform which independently maintain a module, respectively and then provides respective capabilities for different users in the related art.

Employing different independent modules to respectively provide service capabilities for different development and maintenance modes may cause that different modules repeatedly develop a same capability (such as renaming the applet), and development costs and maintenance costs (the maintenance of codes and documents, etc.) are seriously wasted. Moreover, due to independent development of each module, the service capabilities provided by different modules are not completely consistent. When a demand side of the applet switches between different modules, the service capabilities may be inconsistent, which may seriously reduce use experience of a developer.

SUMMARY

According to a first aspect, a method for providing an applet service capability includes: receiving an operation accessing request sent by an applet merchant though an applet management platform, in which the operation accessing request includes an applet token, an applet identifier and an operation accessing type; performing authentication on the operation accessing request through the applet management platform; and providing an applet service capability corresponding to the operation accessing request for the applet merchant when the authentication is passed.

According to a second aspect, an electronic device includes: at least one processor and a memory communicatively coupled to the at least one processor. The memory is configured to store instructions executable by the at least one processor. The at least one processor is configured to: receive an operation accessing request sent by an applet merchant though an applet management platform, in which the operation accessing request comprises an applet token, an applet identifier and an operation accessing type; perform authentication on the operation accessing request through the applet management platform; and provide an applet service capability corresponding to the operation accessing request for the applet merchant when the authentication is passed.

According to a third aspect, a non-transitory computer readable storage medium has computer instructions stored thereon. The computer instructions are configured to cause a computer to execute a method for providing an applet service capability. The method includes: receiving an operation accessing request sent by an applet merchant though an applet management platform, in which the operation accessing request includes an applet token, an applet identifier and an operation accessing type; performing authentication on the operation accessing request through the applet management platform; and providing an applet service capability corresponding to the operation accessing request for the applet merchant when the authentication is passed.

It should be understood that, the contents described in the Summary are not intended to identify key or important features of embodiments of the disclosure, nor is it intended to limit the scope of the disclosure. Other features of the disclosure will become apparent from the following description.

BRIEF DESCRIPTION OF THE DRAWINGS

The accompanying drawings herein are used for better understanding the solution and do not constitute a limitation of the disclosure.

FIG. 3 is a flow chart illustrating a method for providing an applet service capability according to another embodiment of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Embodiment One

Figure 1:
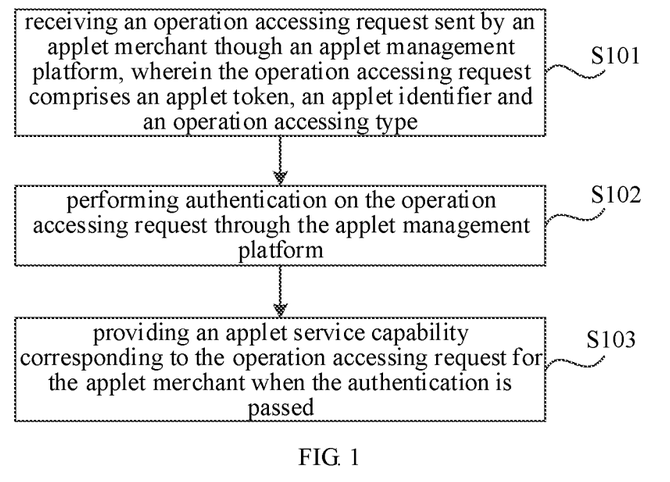
FIG. 1 is a flow chart illustrating a method for providing an applet service capability according to embodiments of the disclosure.

FIG. 1 is a flow chart illustrating a method for providing an applet service capability according to embodiments of the disclosure. The method may be executed by an apparatus for providing an applet service capability or an electronic device. The apparatus or the electronic device may be implemented in form of software and/or hardware. The apparatus or the electronic device may be integrated in any intelligent device with a network communication function. As illustrated in FIG. 1, the method for providing the applet service capability may include the following blocks 101-103.

At block 101, an operation accessing request sent by an applet merchant is received through an applet management platform. The operation accessing request includes an applet token, an applet identifier and an operation accessing type.

In some specific embodiments of the disclosure, the electronic device may receive the operation accessing request sent by the applet merchant through the applet management platform. The operation accessing request includes the applet token, the applet identifier and the operation accessing type. In detail, the electronic device may receive the operation accessing request sent by the applet merchant through an interaction interface in the applet management platform; or the electronic device may receive the operation accessing request sent by the applet merchant through a third-party platform in the applet management platform; or the electronic device may receive the operation accessing request sent by the applet merchant through a developer interface in the applet management platform. The applet token includes a common token, a token under a predetermined development framework, or an application token.

Further, the applet token may include the common token, the token under the predetermined development framework, or the application token. When the electronic device receives the operation accessing request through the interaction interface, the applet token included in the operation accessing request is the common token. When the electronic device receives the operation accessing request through the third-party platform, the applet token included in the operation accessing request is the token under the predetermined development framework. When the electronic device receives the operation accessing request through the developer interface, the applet token included in the operation accessing request is the application token. In addition, the operation accessing type included in the operation accessing request is configured to represent a way in which the applet merchant performs predetermined operations on the applet provided by the applet management platform. For example, adding, updating, modifying and deleting are performed on a certain function in a certain applet.

At block S102, authentication is performed on the operation accessing request through the applet management platform.

In some specific embodiments of the disclosure, the electronic device may perform the authentication on the operation accessing request through the applet management platform. In detail, when the operation accessing request is received through the interaction interface, the electronic device extracts the common token from the operation accessing request, sends the common token to an access gateway in the applet management platform, and performs the authentication on the common token through the access gateway; or when the operation accessing request is received through the third-party platform, the electronic device extracts the token under the predetermined development framework from the operation accessing request, sends the token under the predetermined development framework to the access gateway, and performs the authentication on the token under the predetermined development framework through the access gateway; or when the operation accessing request is received through the developer interface, the electronic device extracts the application token from the operation accessing request, sends the application token to the access gateway, and performs the authentication on authenticating the application token through the access gateway.

At block S103, an applet service capability corresponding to the operation accessing request is provided to the applet merchant when the authentication is passed.

In some specific embodiments of the disclosure, the electronic device may provide the applet service capability corresponding to the operation accessing request for the applet merchant when the authentication is passed. In detail, the electronic device may parse the operation accessing type from the operation accessing request, obtain an applet service authority corresponding to the operation accessing request from an applet public capability unit in the applet management platform based on the operation accessing type; and provide the applet service authority corresponding to the operation accessing request for the applet merchant, such that the applet merchant obtains the applet service capability corresponding to the applet service authority.

With the method for providing the applet service capability according to embodiments of the disclosure, firstly, the operation accessing request sent by the applet merchant is received though the applet management platform. The operation accessing request includes the applet token, the applet identifier and the operation accessing type. Then, the authentication is performed on the operation accessing request through the applet management platform. The applet service capability corresponding to the operation accessing request is provided for the applet merchant when the authentication is passed. In other words, the disclosure provides the developers uniformly with a standard service capability through the applet management platform. However, in an existing method for providing the applet service capability, independent modules are employed to respectively provide service capabilities for different development and maintenance modes. The technical means of providing the standard service capability uniformly for the developers through the applet management platform is employed in the disclosure, thereby overcoming the technical problems in the related art that different modules may repeatedly develop a same capability, the development costs and maintenance costs are seriously wasted and the potential inconsistence of the service capabilities is caused when the independent modules are employed to respectively provide the service capabilities for different development and maintenance modes. With the technical solution of embodiments of the disclosure, the standard service capability may be uniformly provided for the developers, the development and maintenance costs are reduced, and a situation that the service capabilities may not be kept consistent may be avoided, such that the use experience of the developer may be effectively improved. In addition, the technical solution of embodiments of the disclosure is simple and convenient to be implemented and convenient to be popularized, and has a wide application range.

Embodiment Two

Figure 2:
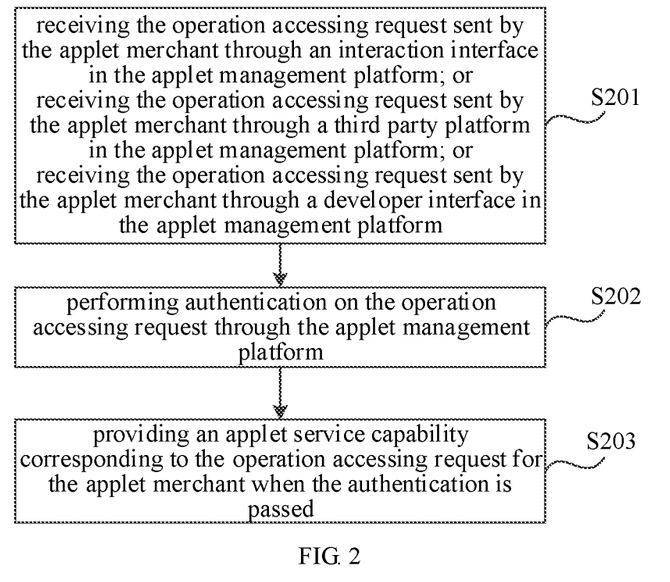
FIG. 2 is a flow chart illustrating a method for providing an applet service capability according to another embodiment of the disclosure.

FIG. 2 is a flow chart illustrating a method for providing an applet service capability according to another embodiment of the disclosure. As illustrated in FIG. 2, the method for providing the applet service capability may include the following blocks 201-203.

At block S201, the operation accessing request sent by the applet merchant is received through an interaction interface in the applet management platform; or the operation accessing request sent by the applet merchant is received through a third party platform in the applet management platform; or the operation accessing request sent by the applet merchant is received through a developer interface in the applet management platform.

In some specific embodiments of the disclosure, the electronic device may receive the operation accessing request sent by the applet merchant through the interaction interface in the applet management platform; or the electronic device may receive the operation accessing request sent by the applet merchant through the third-party platform in the applet management platform; or the electronic device may receive the operation accessing request sent by the applet merchant through the developer interface in the applet management platform. In detail, when the electronic device receives the operation accessing request through the interaction interface, the applet token included in the operation accessing request is the common token "token". When the electronic device receives the operation accessing request through the third-party platform, the applet token included in the operation accessing request is the token under the predetermined development framework "tp_token". When the electronic device receives the operation accessing request through the developer interface, the applet token included in the operation accessing request is the application token "app_token".

An interface for modifying the applet description (app/modify/desc) is taken as an example to introduce a flow of a whole architecture. When the merchant directly uses the Web background for operating, an operation interface may be displayed for the developer. When the developer clicks a save button, a request may be sent to the applet management platform, which includes:

{
"token": "sfwevrerheh",
"app_id": 123,
"new_desc": "applet description"
}.

When the merchant sends the applet to the third-party platform for hosting, modifying the applet description needs to be completed by the third-party request, and the request content includes:

{
"tp_token": "kionbd34534sdf",
"app_id": 123,
"new_desc": "applet description"
}.

When the merchant directly develops the applet and modifies the applet description, a request needs to be submitted to the applet management platform. The request content includes:

{
"app_token": "ber78dsgd",
"app_id": 123,
"new_desc": "applet description"
}.

At block S202, authentication is performed on the operation accessing request through the applet management platform.

In some specific embodiments of the disclosure, the electronic device may perform the authentication on the operation accessing request through the applet management platform. An applet service capability corresponding to the operation accessing request is provided for the applet merchant when the authentication is passed. In detail, when the operation accessing request is received through the interaction interface, the electronic device may extract the common token from the operation accessing request, send the common token to an access gateway in the applet management platform, and perform the authentication on the common token through the access gateway; or when the operation accessing request is received through the third-party platform, the electronic device may extract the token under the predetermined development framework from the operation accessing request, send the token under the predetermined development framework to the access gateway, and perform the authentication on the token under the predetermined development framework through the access gateway; or when the operation accessing request is received through the developer interface, the electronic device may extract the application token from the operation accessing request, send the application token to the access gateway, and perform the authentication on the application token through the access gateway.

In detail, when the electronic device performs the authentication on the common token through the access gateway, the electronic device may determine that the authentication on the common token is passed through the access gateway if a user identifier in the common token is obtained within a predetermined time period. The electronic device may determine that the authentication on the common token is not passed through the access gateway if the user identifier of the common token is not obtained within the predetermined time period.

In detail, when the electronic device performs the authentication on the token under the predetermined development framework through the access gateway, the electronic device may determine that the authentication on the operation accessing request is passed through the access gateway if an identifier of the third-party platform and the applet identifier are parsed from the token under the predetermined development framework. The electronic device may determine that the authentication on the operation accessing request is not passed through the access gateway when the identifier of the third-party platform or the applet identifier is not parsed from the token under the predetermined development framework.

In detail, when the electronic device performs the authentication on the application token through the access gateway, the electronic device may determine that the authentication on the operation accessing request is passed through the access gateway if the applet identifier is decrypted from the application token. The electronic device may determine that the authentication on the operation accessing request is not passed through the access gateway when the applet identifier is not decrypted from the application token.

At block S203, an applet service capability corresponding to the operation accessing request is provided for the applet merchant when the authentication is passed.

With the method for providing the applet service capability according to embodiments of the disclosure, firstly, the operation accessing request sent by the applet merchant is received though the applet management platform. The operation accessing request includes the applet token, the applet identifier and the operation accessing type. Then, the authentication is performed on the operation accessing request through the applet management platform. The applet service capability corresponding to the operation accessing request is provided for the applet merchant when the authentication is passed. In other words, the disclosure provides the developers uniformly with a standard service capability through the applet management platform. However, in an existing method for providing the applet service capability, independent modules are employed to respectively provide service capabilities for different development and maintenance modes. The technical solution of providing the standard service capability for the developers uniformly through the applet management platform is employed in the disclosure, thereby overcoming the technical problems in the related art that different modules may repeatedly develop a same capability the development costs and maintenance costs are seriously wasted and the potential inconsistence of the service capabilities is caused when the independent modules are employed to respectively provide the service capabilities for different development and maintenance modes. With the technical solution of embodiments of the disclosure, the standard service capability may be uniformly provided for the developer, the development and maintenance costs are reduced, and a situation that the service capabilities may not be kept consistent may be avoided, such that the use experience of the developers may be effectively improved. In addition, the technical solution of embodiments of the disclosure is simple and convenient to be implemented and convenient to be popularized, and has a wide application range.

Embodiment Three

FIG. 3 is a flow chart illustrating a method for providing an applet service capability according to another embodiment of the disclosure. As illustrated in FIG. 3, the method for providing the applet service capability may include the following blocks 301-306.

At block S301, the operation accessing request sent by the applet merchant is received through an interaction interface in the applet management platform; or the operation accessing request sent by the applet merchant is received through a third party platform in the applet management platform; or the operation accessing request sent by the applet merchant is received through a developer interface in the applet management platform. The applet token includes a common token, a token under a predetermined development framework, or an application token.

Figure 4:
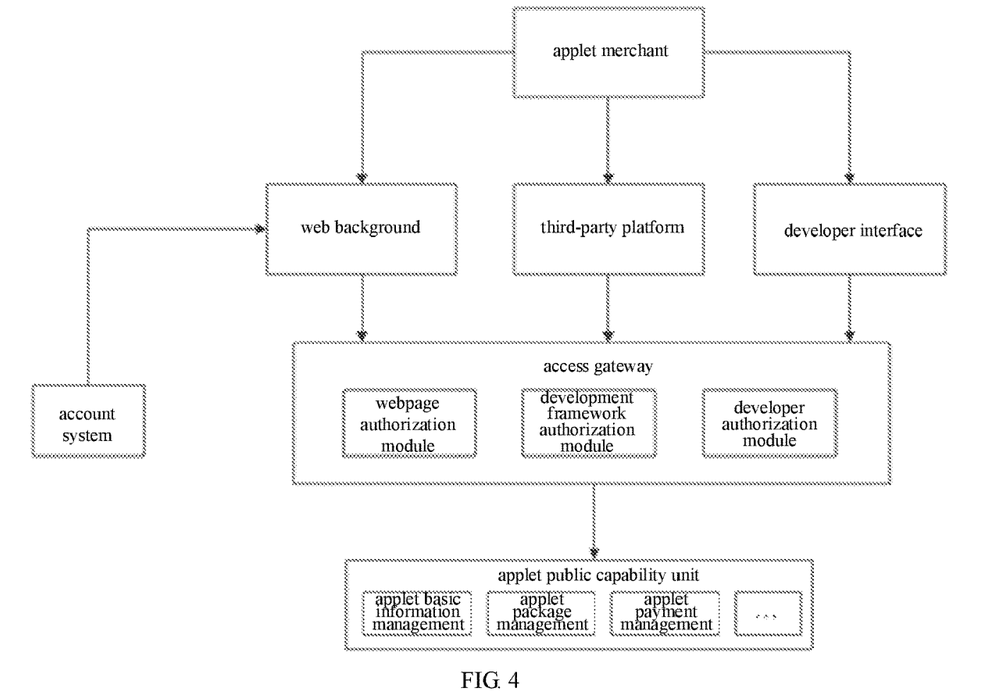
FIG. 4 is a structural block diagram illustrating an applet management platform according to embodiments of the disclosure.

In some specific embodiments of the disclosure, the electronic device may receive the operation accessing request sent by the applet merchant through the interaction interface in the applet management platform; or the electronic device may receive the operation accessing request sent by the applet merchant through the third party platform in the applet management platform; or the electronic device may receive the operation accessing request sent by the applet merchant through the developer interface in the applet management platform. The applet token includes the common token, the token under the predetermined development framework, or the application token. FIG. 4 is a structural block diagram illustrating an applet management platform according to embodiments of the disclosure. As illustrated in FIG. 4, the applet management platform may include: a webpage background (also called the web background), a third-party platform, a developer interface, an access gateway, an account system, and an applet public capability unit. Further, the access gateway may include a webpage authorization module (also called a web authorization module), a development framework authorization module (also called a TP authorization module), and a developer authorization module. Further, the applet public capability unit may include an applet basic information management unit, an applet package management unit, an applet payment management unit, and the like. In detail, the web background may be an applet management platform presented to the developer in the form of a UI (user interface), developed and maintained by the platform side, which is suitable for a self-operated operator with an uncomplicated requirement and lacks of self-developed ability. The third-party platform is a platform which may help the merchant who has neither self-developed ability nor operational ability for developing and operating on their behalf. The third-party platform, the merchant and the applet management platform constitutes three parties. The third-party platform requires the authentication from the merchant to perform interface operation. The developer interface is an interface provided by the platform side through which a developer with a self-developed ability may perform management operation for the applet. The account system, also known as a pass platform, provides a capability such as a standard login, and an online status verification. The access gateway provides a permission storage function, and is configured to store information related to the permission. For example, an operator or manager may generally configure the following data: the permission scope which a user uid has for a app_id; the permission scope which a third-party platform tp_app_id has for a app_id; and the permission scope which an interface belongs to. The applet public capability unit is configured to store a general capability deposited by the applet, such as an applet basic information management (such as modifying the name and description of the applet), an applet package management (such as extracting an applet package), an applet payment management.

At block S302, when the operation accessing request is received through the interaction interface, the common token is extracted from the operation accessing request, and the common token is sent to an access gateway in the applet management platform; or when the operation accessing request is received through the third-party platform, the token under the predetermined development framework is extracted from the operation accessing request, and the token under the predetermined development framework is sent to the access gateway; or when the operation accessing request is received through the developer interface, the application token is extracted from the operation accessing request, and the application token is sent to the access gateway.

At block S303, the authentication is performed on the common token through the access gateway; or the authentication is performed on the token under the predetermined development framework through the access gateway; or the authentication is performed on the application token through the access gateway.

At block S304, the operation accessing type is parsed from the operation accessing request when the authentication is passed.

In some specific embodiments of the disclosure, the electronic device parses the operation accessing type from the operation accessing request when the authentication is passed.

At block S305, an applet service authority corresponding to the operation accessing request is obtained from the applet public capability unit in the applet management platform based on the operation accessing type. The applet public capability unit is configured to store a general capability deposited by the applet, such as an applet basic information management (such as modifying the name and description of the applet), an applet package management (such as extracting an applet package), an applet payment management.

At block S306, the applet service authority corresponding to the operation accessing request is provided for the applet merchant, such that the applet merchant obtains the applet service capability corresponding to the applet service authority.

With the method for providing the applet service capability according to embodiments of the disclosure, firstly, the operation accessing request sent by the applet merchant is received though the applet management platform. The operation accessing request includes the applet token, the applet identifier and the operation accessing type. Then, the authentication is performed on the operation accessing request through the applet management platform. The applet service capability corresponding to the operation accessing request is provided for the applet merchant when the authentication is passed. In other words, the disclosure provides the developers uniformly with a standard service capability through the applet management platform. However, in an existing method for providing the applet service capability, independent modules are employed to respectively provide service capabilities for different development and maintenance modes. The technical means of providing the standard service capability for the developers uniformly through the applet management platform is employed in the disclosure, thereby overcoming the technical problems in the related art that different modules may repeatedly develop a same capability, the development costs and maintenance costs are seriously wasted and the potential inconsistency of the service capabilities is caused when the independent modules are employed to respectively provide the service capabilities for different development and maintenance modes. With the technical solution of embodiments of the disclosure, the standard service capability may be uniformly provided for the developers, the development and maintenance costs are reduced, and a situation that the service capabilities may not be kept consistent may be avoided, such that the use experience of the developers may be effectively improved. In addition, the technical solution of embodiments of the disclosure is simple and convenient to be implemented and convenient to be popularized, and has a wide application range.

Embodiment Four

Figure 5:
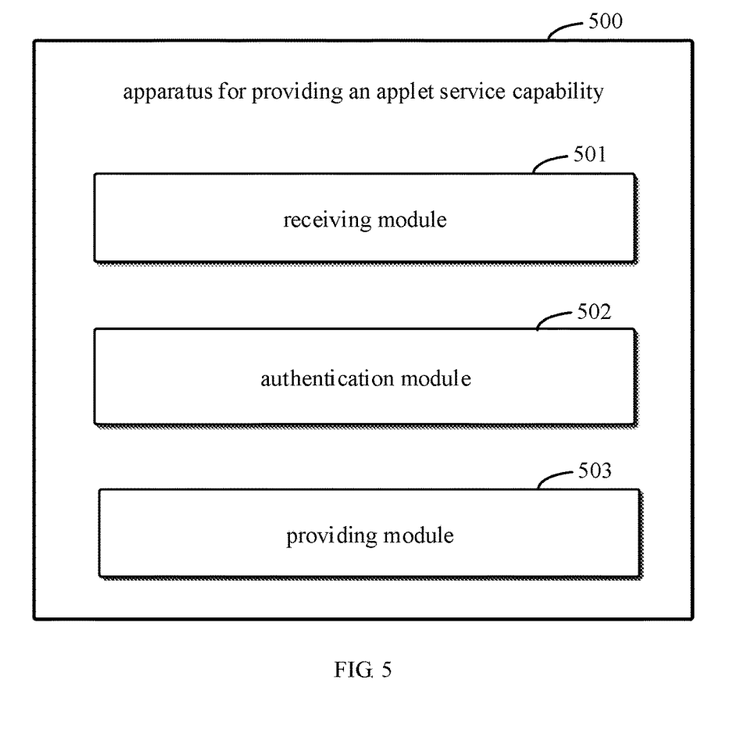
FIG. 5 is a block diagram illustrating an apparatus for providing an applet service capability according to embodiments of the disclosure.

FIG. 5 is a block diagram illustrating an apparatus for providing an applet service capability according to embodiments of the disclosure. As illustrated in FIG. 5, the apparatus 500 includes: a receiving module 501, an authentication module 502, and a providing module 503.

The receiving module 501 is configured to receive an operation accessing request sent by an applet merchant though an applet management platform. The operation accessing request includes an applet token, an applet identifier and an operation accessing type. The authentication module 502 is configured to perform authentication on the operation accessing request through the applet management platform. The providing module 503 is configured to provide an applet service capability corresponding to the operation accessing request for the applet merchant when the authentication is passed.

Further, the receiving module is configured to: receive the operation accessing request sent by the applet merchant through an interaction interface in the applet management platform; or receive the operation accessing request sent by the applet merchant through a third party platform in the applet management platform; or receive the operation accessing request sent by the applet merchant through a developer interface in the applet management platform. The applet token includes a common token, a token under a predetermined development framework, or an application token.

Further, the authentication module 502 is configured to: when the operation accessing request is received through the interaction interface, extract the common token from the operation accessing request, send the common token to an access gateway in the applet management platform, and perform the authentication on the common token through the access gateway; when the operation accessing request is received through the third-party platform, extract the token under the predetermined development framework from the operation accessing request, send the token under the predetermined development framework to the access gateway, and perform the authentication on the token under the predetermined development framework through the access gateway; or when the operation accessing request is received through the developer interface, extract the application token from the operation accessing request, send the application token to the access gateway, and perform the authentication on the application token through the access gateway.

Further, the authentication module 502 is configured to: determine that the authentication on the common token is passed through the access gateway when a user identifier in the common token is obtained within a predetermined time period; and determine that the authentication the common token is not passed through the access gateway when the user identifier in the common token is not obtained within the predetermined time period.

Further, the authentication module 502 is configured to: determine that the authentication on the operation accessing request is passed through the access gateway when an identifier of the third-party platform and the applet identifier are parsed from the token under the predetermined development framework; and determine that the authentication on the operation accessing request is not passed through the access gateway when the identifier of the third-party platform or the applet identifier is not parsed from the token under the predetermined development framework.

Further, the authentication module 502 is configured to: determine that the authentication on the operation accessing request is passed through the access gateway when the applet identifier is decrypted from the application token; and determine that the authentication on the operation accessing request is not passed through the access gateway when the applet identifier is not decrypted from the application token.

Further, the providing module 503 is configured to: parse the operation accessing type from the operation accessing request; obtain an applet service authority corresponding to the operation accessing request from an applet public capability unit in the applet management platform based on the operation accessing type; and provide the applet service authority corresponding to the operation accessing request to the applet merchant, such that the applet merchant obtains the applet service capability corresponding to the applet service authority.

The above apparatus for providing the applet service capability may execute the method according to any of embodiments of the disclosure, and has corresponding functional modules and beneficial effects for executing the method. For technical details not described in detail in this embodiment, please refer to the method for providing the applet service capability according to any of embodiments of the disclosure.

Embodiment Five

According to embodiments of the disclosure, the disclosure also provides an electronic device and a readable storage medium.

Figure 6:
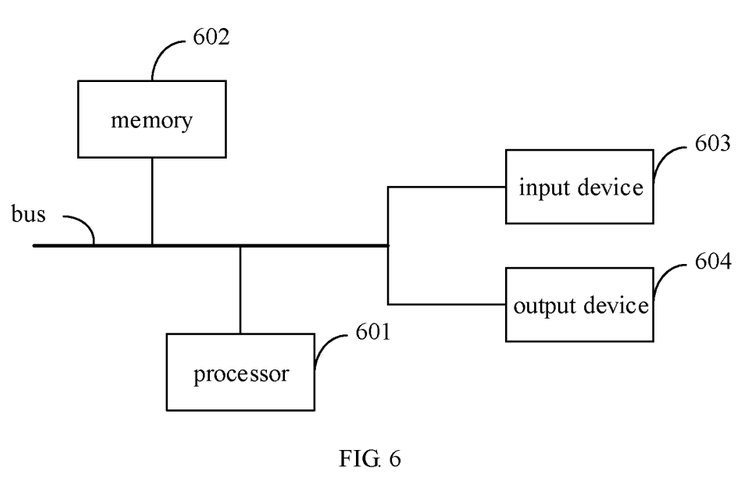
FIG. 6 is a block diagram illustrating an electronic device capable of implementing a method for providing an applet service capability according to embodiments of the disclosure.

As illustrated in FIG. 6, FIG. 6 is a block diagram illustrating an electronic device capable of implementing a method for providing an applet service capability according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 6, the electronic device includes: one or more processors 601, a memory 602, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 6, a processor 601 is taken as an example.

The memory 602 is a non-transitory computer readable storage medium provided by the disclosure. The memory is configured to store instructions executable by at least one processor, to enable the at least one processor to execute the method for providing the applet service capability provided by the disclosure. The non-transitory computer readable storage medium provided by the disclosure is configured to store computer instructions. The computer instructions are configured to enable a computer to execute the method for providing the applet service capability provided by the disclosure.

As the non-transitory computer readable storage medium, the memory 602 may be configured to store non-transitory software programs, non-transitory computer executable programs and modules, such as program instructions/module (such as the receiving module 501, the authentication module 502, and the providing module 503 illustrated in FIG. 5) corresponding to the method for providing the applet service capability according to embodiments of the disclosure. The processor 601 is configured to execute various functional applications and data processing of the server by operating non-transitory software programs, instructions and modules stored in the memory 602, that is, implements the method for providing the applet service capability according to the above method embodiments.

The memory 602 may include a storage program region and a storage data region. The storage program region may store an application required by an operating system and at least one function. The storage data region may store data created according to predicted usage of the electronic device capable of implementing the method for providing the applet service capability. In addition, the memory 602 may include a high-speed random access memory, and may also include a non-transitory memory, such as at least one disk memory device, a flash memory device, or other non-transitory solid-state memory device. In some embodiments, the memory 602 may optionally include memories remotely located to the processor 601, and these remote memories may be connected to the electronic device via a network. Examples of the above network include, but are not limited to, an Internet, an intranet, a local area network, a mobile communication network and combinations thereof.

The electronic device capable of implementing the method for providing the applet service capability may also include: an input device 603 and an output device 604. The processor 601, the memory 602, the input device 603, and the output device 604 may be connected via a bus or in other means. In FIG. 6, the bus is taken as an example.

The input device 603 may receive inputted digital or character information, and generate key signal input related to user setting and function control of the electronic device, such as a touch screen, a keypad, a mouse, a track pad, a touch pad, an indicator stick, one or more mouse buttons, a trackball, a joystick and other input device. The output device 604 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other. The server may be a cloud server, also known as cloud computing server or a cloud host, which is a host product in a cloud computing service system, to solve the defects of difficult management and weak business scalability in a traditional physical host and a VPS service.

According to the technical solution of embodiments of the disclosure, firstly, the operation accessing request sent by the applet merchant is received though the applet management platform. The operation accessing request includes the applet token, the applet identifier and the operation accessing type. Then, the authentication is performed on the operation accessing request through the applet management platform. The applet service capability corresponding to the operation accessing request is provided for the applet merchant when the authentication is passed. In other words, the disclosure provides the developers uniformly with a standard service capability through the applet management platform. However, in an existing method for providing the applet service capability, independent modules are employed to respectively provide service capabilities for different development and maintenance modes. The technical means of providing the standard service capability uniformly for the developers through the applet management platform is employed in the disclosure, thereby overcoming the technical problems in the related art that different modules may repeatedly develop a same capability, the development costs and maintenance costs are seriously wasted and the potential inconsistence of the service capabilities is caused when the independent modules are employed to respectively provide the service capabilities for different development and maintenance modes. With the technical solution of embodiments of the disclosure, the standard service capability may be uniformly provided for the developer, the development and maintenance costs are reduced, and a situation that the service capabilities may not be kept consistent may be avoided, such that the use experience of the developers may be effectively improved. In addition, the technical solution of embodiments of the disclosure is simple and convenient to be implemented and convenient to be popularized, and has a wide application range.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for providing an applet service capability, comprising:

receiving an operation accessing request sent by an applet merchant through an applet management platform, wherein the operation accessing request comprises an applet token, an applet identifier and an operation accessing type, and the applet token comprises a common token, a token under a predetermined development framework, or an application token;

performing authentication on the operation accessing request through the applet management platform; and providing an applet service capability corresponding to the operation accessing request for the applet merchant when the authentication is passed;

wherein when the operation accessing request is received through an interaction interface and the applet token is the common token, performing authentication on the operation accessing request comprises:

extracting the common token from the operation accessing request, sending the common token to an access gateway in the applet management platform, determining that authentication on the common token is passed through the access gateway when a user identifier in the common token is obtained within a predetermined time period, and determining that the authentication on the common token is not passed through the access gateway when the user identifier in the common token is not obtained within the predetermined time period.

2. The method of claim 1, wherein receiving the operation accessing request sent by the applet merchant comprises:

receiving the operation accessing request sent by the applet merchant through the interaction interface in the applet management platform; or receiving the operation accessing request sent by the applet merchant through a third party platform in the applet management platform; or receiving the operation accessing request sent by the applet merchant through a developer interface in the applet management platform.

3. The method of claim 2, wherein performing the authentication on the operation accessing request comprises:

when the operation accessing request is received through the third-party platform, extracting the token under the predetermined development framework from the operation accessing request, sending the token under the predetermined development framework to the access gateway, and performing the authentication on the token under the predetermined development framework through the access gateway; or when the operation accessing request is received through the developer interface, extracting the application token from the operation accessing request, sending the application token to the access gateway, and performing the authentication on the application token through the access gateway.

4. The method of claim 3, wherein performing the authentication on the operation accessing request through the access gateway comprises:

determining that the authentication on the operation accessing request is passed through the access gateway when an identifier of the third-party platform and the applet identifier are parsed from the token under the predetermined development framework; and determining that the authentication on the operation accessing request is not passed through the access gateway when the identifier of the third-party platform or the applet identifier is not parsed from the token under the predetermined development framework.

5. The method of claim 3, wherein performing the authentication on the operation accessing request through the access gateway comprises:

determining that the authentication on the operation accessing request is passed through the access gateway when the applet identifier is decrypted from the application token; and determining that the authentication on the operation accessing request is not passed through the access gateway when the applet identifier is not decrypted from the application token.

6. The method of claim 1, wherein providing the applet service capability corresponding to the operation accessing request for the applet merchant comprises:

parsing the operation accessing type from the operation accessing request;

obtaining an applet service authority corresponding to the operation accessing request from an applet public capability unit in the applet management platform based on the operation accessing type; and providing the applet service authority corresponding to the operation accessing request for the applet merchant, such that the applet merchant obtains the applet service capability corresponding to the applet service authority.

7. An electronic device, comprising:

at least one processor; and a memory communicatively coupled to the at least one processor and configured to store instructions executable by the at least one processor, wherein the at least one processor is configured to:

receive an operation accessing request sent by an applet merchant through an applet management platform, in which the operation accessing request comprises an applet token, an applet identifier and an operation accessing type, and the applet token comprises a common token, a token under a predetermined development framework, or an application token;

perform authentication on the operation accessing request through the applet management platform; and provide an applet service capability corresponding to the operation accessing request for the applet merchant when the authentication is passed;

wherein when the operation accessing request is received through an interaction interface and the applet token is the common token, the at least one processor is further configured to:

extract the common token from the operation accessing request, send the common token to an access gateway in the applet management platform, determine that authentication on the common token is passed through the access gateway when a user identifier in the common token is obtained within a predetermined time period, and determine that the authentication on the common token is not passed through the access gateway when the user identifier in the common token is not obtained within the predetermined time period.

8. The electronic device of claim 7, wherein the at least one processor is further configured to:

receive the operation accessing request sent by the applet merchant through the interaction interface in the applet management platform; or receive the operation accessing request sent by the applet merchant through a third party platform in the applet management platform; or receive the operation accessing request sent by the applet merchant through a developer interface in the applet management platform.

9. The electronic device of claim 8, wherein the at least one processor is further configured to:

when the operation accessing request is received through the third-party platform, extract the token under the predetermined development framework from the operation accessing request, send the token under the predetermined development framework to the access gateway, and perform the authentication on the token under the predetermined development framework through the access gateway; or when the operation accessing request is received through the developer interface, extract the application token from the operation accessing request, send the application token to the access gateway, and perform the authentication on the application token through the access gateway.

10. The electronic device of claim 9, wherein the at least one processor is further configured to:

determine that the authentication on the operation accessing request is passed through the access gateway when an identifier of the third-party platform and the applet identifier are parsed from the token under the predetermined development framework; and determine that the authentication on the operation accessing request is not passed through the access gateway when the identifier of the third-party platform or the applet identifier is not parsed from the token under the predetermined development framework.

11. The electronic device of claim 9, wherein the at least one processor is further configured to:
- determine that the authentication on the operation accessing request is passed through the access gateway when the applet identifier is decrypted from the application token; and
- determine that the authentication on the operation accessing request is not passed through the access gateway when the applet identifier is not decrypted from the application token.

12. The electronic device of claim 7, wherein the at least one processor is further configured to:
- parse the operation accessing type from the operation accessing request;
  - obtain an applet service authority corresponding to the operation accessing request from an applet public capability unit in the applet management platform based on the operation accessing type; and
  - provide the applet service authority corresponding to the operation accessing request to the applet merchant, such that the applet merchant obtains the applet service capability corresponding to the applet service authority.

13. A non-transitory computer readable storage medium having computer instructions stored thereon, wherein the computer instructions are configured to cause a computer to execute a method for providing an applet service capability, the method comprising:
- receiving an operation accessing request sent by an applet merchant through an applet management platform, wherein the operation accessing request comprises an applet token, an applet identifier and an operation accessing type, and the applet token comprises a common token, a token under a predetermined development framework, or an application token;
- performing authentication on the operation accessing request through the applet management platform; and
- providing an applet service capability corresponding to the operation accessing request for the applet merchant when the authentication is passed;
- wherein when the operation accessing request is received through an interaction interface and the applet token is the common token, performing authentication on the operation accessing request comprises:
- extracting the common token from the operation accessing request,
- sending the common token to an access gateway in the applet management platform,
- determining that authentication on the common token is passed through the access gateway when a user identifier in the common token is obtained within a predetermined time period, and
- determining that the authentication on the common token is not passed through the access gateway when the user identifier in the common token is not obtained within the predetermined time period.

14. The storage medium of claim 13, wherein receiving the operation accessing request sent by the applet merchant comprises:
- receiving the operation accessing request sent by the applet merchant through an interaction interface in the applet management platform; or
- receiving the operation accessing request sent by the applet merchant through a third party platform in the applet management platform; or
- receiving the operation accessing request sent by the applet merchant through a developer interface in the applet management platform.

15. The storage medium of claim 14, wherein performing the authentication on the operation accessing request comprises:
- when the operation accessing request is received through the third-party platform, extracting the token under the predetermined development framework from the operation accessing request, sending the token under the predetermined development framework to the access gateway, and performing the authentication on the token under the predetermined development framework through the access gateway; or
- when the operation accessing request is received through the developer interface, extracting the application token from the operation accessing request, sending the application token to the access gateway, and performing the authentication on the application token through the access gateway.

16. The storage medium of claim 15, wherein performing the authentication on the operation accessing request through the access gateway comprises:
- determining that the authentication on the operation accessing request is passed through the access gateway when an identifier of the third-party platform and the applet identifier are parsed from the token under the predetermined development framework; and
- determining that the authentication on the operation accessing request is not passed through the access gateway when the identifier of the third-party platform or the applet identifier is not parsed from the token under the predetermined development framework.

17. The storage medium of claim 15, wherein performing the authentication on the operation accessing request through the access gateway comprises:
- determining that the authentication on the operation accessing request is passed through the access gateway when the applet identifier is decrypted from the application token; and
- determining that the authentication on the operation accessing request is not passed through the access gateway when the applet identifier is not decrypted from the application token.

* * * * *